(12) United States Patent
Biskup (10) Patent No.: US 10,063,071 B2
(45) Date of Patent: Aug. 28, 2018

(54) BALANCE RESISTOR AND LOW PASS FILTER

(71) Applicant: Atieva, Inc., Redwood City, CA (US)

(72) Inventor: Richard J. Biskup, Redwood City, CA (US)

(73) Assignee: Atieva, Inc., Menlo Park, CA (US)

( * ) Notice: Subject to any disclaimer, the term of this patent is extended or adjusted under 35 U.S.C. 154(b) by 438 days.

(21) Appl. No.: 13/834,983

(22) Filed: Mar. 15, 2013

(65) Prior Publication Data

US 2014/0266050 A1 Sep. 18, 2014

(51) Int. Cl.
H02J 7/00 (2006.01)

(52) U.S. Cl.
CPC .......... H02J 7/0021 (2013.01); H02J 7/0016 (2013.01)

(58) Field of Classification Search
CPC .................................................. H02J 7/0016
USPC ......................................................... 320/118
See application file for complete search history.

(56) References Cited

U.S. PATENT DOCUMENTS

| | | |
|---|---|---|
| 4,456,965 A | 6/1984 | Graber et al. |
| 4,760,434 A | 7/1988 | Tsuzuki et al. |
| 5,079,608 A | 1/1992 | Wodarczyk et al. |
| 6,108,219 A | 8/2000 | French |
| 6,172,383 B1 | 1/2001 | Williams |
| 6,286,491 B1 | 9/2001 | Fukatsu et al. |
| 6,639,408 B2 | 10/2003 | Yudahira et al. |
| 6,913,109 B2 | 7/2005 | Kodama |
| 6,944,695 B1 | 9/2005 | Tangen |
| 7,288,919 B2 | 10/2007 | Morita |
| 7,459,885 B2 | 12/2008 | Miyamoto |
| 7,638,977 B2 | 12/2009 | Park |
| 7,656,164 B2 | 2/2010 | Kawamura |

(Continued)

FOREIGN PATENT DOCUMENTS

| | | |
|---|---|---|
| EP | 0992811 | 12/2000 |
| EP | 1676427 | 8/2012 |

(Continued)

OTHER PUBLICATIONS

Goodenough, Frank. "Isolate, Amplify, Multiplex 4+ Channels," Analog Dialogue, 1980, pp. 3-4, vol. 14, No. 2.

(Continued)

*Primary Examiner* — Samuel Berhanu
*Assistant Examiner* — Tessema Kebede
(74) *Attorney, Agent, or Firm* — Womble Bond Dickinson (US) LLP (57) ABSTRACT

A battery cell balancing and measuring apparatus is provided. The apparatus includes a plurality of terminals having a portion of the terminals grouped as terminal pairs, each terminal of the plurality of terminals operable to couple to a node in a battery stack. Each terminal pair having a capacitor and a switch coupled in parallel with each other, the capacitor and the switch coupled across respective terminal pair. The apparatus includes a plurality of resistors, each resistor of the plurality of resistors coupled to a terminal of the plurality of terminals. Each resistor of the plurality of resistors provides a discharge path for a respective battery cell coupled to a terminal pair via the switch and wherein each resistor of the plurality of resistors provides a low pass filter path for the respective battery cell via the capacitor.

20 Claims, 5 Drawing Sheets

(56) References Cited

U.S. PATENT DOCUMENTS

| | | | |
|---|---|---|---|
| 7,768,034 B2 | 8/2010 | Calafut et al. | |
| 7,839,217 B2 | 11/2010 | Okuma | |
| 7,924,016 B2 | 4/2011 | Shimizu | |
| 8,092,932 B2 | 1/2012 | Phillips et al. | |
| 8,106,706 B2 | 1/2012 | Easwaran et al. | |
| 8,174,237 B2 | 5/2012 | Kosugi et al. | |
| 8,212,571 B2 | 7/2012 | Emori et al. | |
| 8,222,863 B2 | 7/2012 | Sakakibara | |
| 8,231,996 B2 | 7/2012 | Howard et al. | |
| 8,334,673 B2 | 12/2012 | Ishikawa | |
| 8,354,186 B2 | 1/2013 | Muis | |
| 8,536,826 B2 | 9/2013 | Matsuoka et al. | |
| 8,542,056 B2 | 9/2013 | Rossi et al. | |
| 8,586,230 B2 | 11/2013 | Kim et al. | |
| 8,598,939 B2 | 12/2013 | Shimizu et al. | |
| 8,719,477 B2 | 5/2014 | Kaneko | |
| 8,729,864 B2 | 5/2014 | Dittmer et al. | |
| 8,786,261 B2 | 7/2014 | Andrea | |
| 8,868,807 B2 | 10/2014 | Kashima | |
| 8,933,665 B2 | 1/2015 | Athas et al. | |
| 9,046,584 B2 | 6/2015 | Tsuchiya et al. | |
| 2004/0155629 A1* | 8/2004 | Kobayashi et al. | 320/127 |
| 2004/0225814 A1 | 11/2004 | Ervin | |
| 2011/0260770 A1* | 10/2011 | Sekiguchi | G01R 31/362 327/333 |
| 2012/0025835 A1* | 2/2012 | Chandler et al. | 324/433 |
| 2012/0194135 A1* | 8/2012 | Mizoguchi | 320/118 |
| 2013/0052514 A1 | 2/2013 | Kim | |
| 2013/0300371 A1* | 11/2013 | Bills | H02J 7/0016 320/118 |
| 2014/0049224 A1* | 2/2014 | Hua | H02J 7/0068 320/136 |

FOREIGN PATENT DOCUMENTS

| | | |
|---|---|---|
| EP | 2506390 | 10/2012 |
| EP | 2538513 | 12/2012 |
| JP | 2003309982 | 10/2003 |
| JP | 2010183766 | 8/2010 |
| JP | 2012208068 | 10/2012 |
| KR | 1020060111946 | 10/2006 |
| KR | 1020100088369 | 8/2010 |
| KR | 1020110056699 | 5/2011 |
| KR | 1020120055241 | 5/2012 |
| WO | WO 2011072939 | 6/2011 |

OTHER PUBLICATIONS

International Search Report and the Written Opinion of the International Searching Authority, PCT/US2014/024861, dated Sep. 18, 2014.

Energizer, Eveready Carbon Zinc., Battery Application Manual. Nov. 6, 2001.

Parks, James E.; Ohms Law III Resistors in Series and Parallel, Department of Physics and Anatomy, University of Tennessee, 2007.

Notification of Transmittal of the International Search Report and Written Opinion of the International Searching Authority, PCT/US2014/028636, dated Aug. 26, 2014.

Notification of Transmittal of the International Search Report and Written Opinion of the International Searching Authority, PCT/US2014/028658, dated Aug. 13, 2014.

International Search Report, PCT/US2014/028616, dated Jul. 7, 2014.

International Search Report, PCT/US2014/025518, dated Jun. 18, 2014.

International Search Report, PCT/US2014/022807, dated Jul. 3, 2014.

* cited by examiner

BALANCE RESISTOR AND LOW PASS FILTER

BACKGROUND

Cells in a rechargeable battery pack have variations in charging capacity, discharging capacity and/or state of charge. For optimal use, the cells should be balanced. To balance cells, the voltage across each cell or parallel group of cells is measured. In passive balancing, cells or groups of cells with higher voltage are then discharged until their voltages match that of the other cells. Cell discharge current is usually routed through a discharge resistor. Electrically noisy operating environments, such as in electric and hybrid vehicles, make measuring the voltage across each cell or group of cells difficult. This can cause errors in determination of whether or not a cell should be discharged or how much the cell should be discharged, when balancing. Frequent incomplete charge and discharge cycles, such as encountered with electric and hybrid vehicles, can exacerbate cell differences in state of charge. Also, an electrical fault such as a disconnected or burned out discharge resistor or a broken switch could be present in a battery balancing circuit, and this situation could go undetected. Some types of batteries, if not properly balanced, can fail catastrophically.

It is within this context that the embodiments arise.

SUMMARY

In one embodiment, a battery cell balancing and measuring apparatus is provided. The apparatus includes a plurality of terminals having a portion of the terminals grouped as terminal pairs, each terminal of the plurality of terminals operable to couple to a node in a battery stack. Each terminal pair having a capacitor and a switch coupled in parallel with each other, the capacitor and the switch coupled across respective terminal pair. The apparatus includes a plurality of resistors, each resistor of the plurality of resistors coupled to a terminal of the plurality of terminals. Each resistor of the plurality of resistors provides a discharge path for a respective battery cell coupled to a terminal pair via the switch and wherein each resistor of the plurality of resistors provides a low pass filter path for the respective battery cell via the capacitor.

In another embodiment, a battery cell balancing and measuring apparatus is provided. The apparatus includes a plurality of first terminals configured to connect to nodes of a battery stack and a plurality of second terminals equal in number to a number of the plurality of first terminals. The apparatus includes a plurality of capacitors equal in number to a number of cells in the battery stack, the plurality of capacitors being coupled in series, with each capacitor coupled across a corresponding pair of the second terminals. The apparatus includes a plurality of resistors, each resistor coupled at one end to one of the first terminals and coupled at an opposing end to a corresponding one of the second terminals. The apparatus includes a plurality of switches equal in number to the number of cells, each switch coupled to one of the second terminals and coupled either to a neighboring one of the second terminals or to a one of the first terminals. A switch of the plurality of switches when activated provides a discharge path for a corresponding cell of the battery stack via one of the plurality of resistors and via the switch. When the switch is deactivated a voltage of the cell is expressed at the corresponding pair of the second terminals, where the voltage of the cell is filtered through a low pass filter that includes the one of the plurality of resistors and a capacitor of the plurality of capacitors.

In yet another embodiment, a method of measuring cell voltage and balancing cells in a battery stack is provided. The method includes low pass filtering a voltage of one of a plurality of cells in a battery pack via a resistor and a capacitor in series with each other, with a switch deactivated. The switch is coupled to the resistor and to the one of the plurality of cells. The method includes passing a discharge current of the one of the plurality of cells through the resistor and the switch, with the switch activated.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The embodiments provide various battery cell balancing and measuring apparatuses. All of the apparatuses shown allow measurement of voltage of each cell in a battery stack, and allow individual discharge of a cell, independent of whether other cells are discharged at that time. These apparatuses may be used along with rechargeable battery packs in electric vehicles, hybrid vehicles and other land, sea, or air based applications. The embodiments are suitable for lithium-ion and other types of rechargeable cells. This application is related to U.S. application Ser. Nos. 13/794,535, 13/835,377, 13/835,595, and 13/835,760, each of which is incorporated herein by reference for all purposes.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
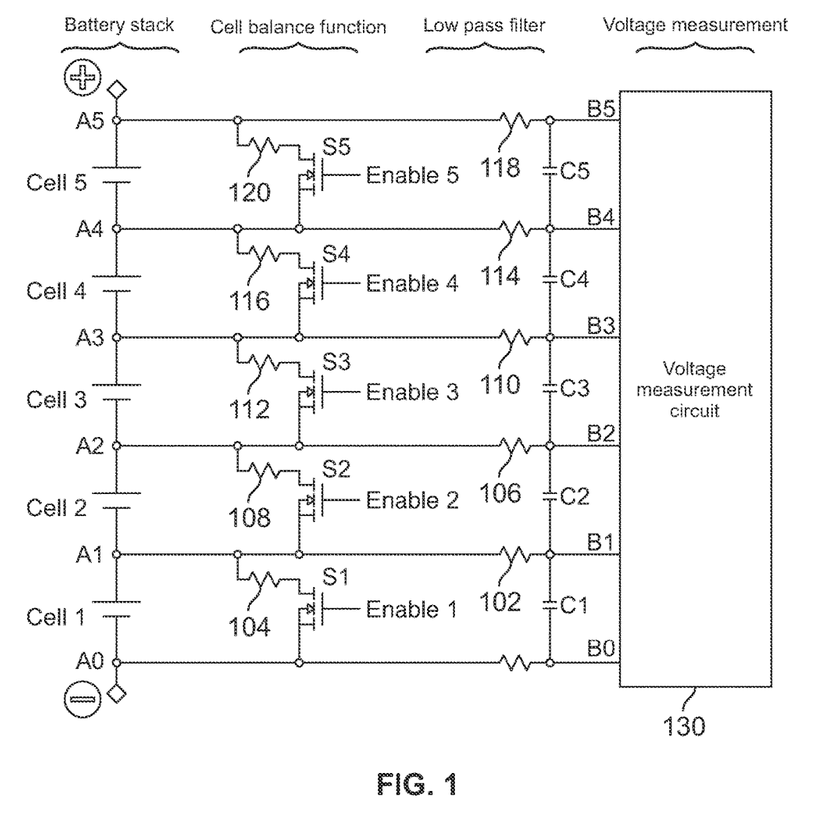
FIG. 1 is a schematic of a battery cell balancing and measuring apparatus.

The battery cell balancing and measuring apparatus shown in FIG. 1 employs a low pass RC (resistor capacitor) filter for each cell, such as Cell 1, Cell 2, Cell 3, Cell 4, Cell 5, in a battery stack. It should be appreciated that a battery stack can use various combinations of cells in parallel and series. For example, a 5S28P (five series twenty-eight parallel) battery stack has twenty-eight cells in parallel, and five of these parallel groups are stacked in series. The low pass RC filter helps filter out electrical noise, so that a voltage measuring device 130 can more accurately measure cell voltages. For example, the voltage across one of the cells Cell 1 is filtered through a low pass filter made of a resistor 102 and a capacitor C1. The low pass filtered cell voltage is presented across the terminals B1 and B0 of the apparatus, which are coupled to the voltage measurement device 130. Similarly, the cell voltage of Cell 2 is filtered through a low pass filter that includes a resistor 106 and a capacitor C2, and presented across the terminals B2 and B1 of the apparatus to be measured by the voltage measurement device 130. Further low pass filters that include resistors 110, 114, 118 and capacitors C3, C4, C5 handle cell voltages from the remaining cells Cell 3, Cell 4, Cell 5, respectively. The low pass filtered cell voltages are presented across pairs of terminals B3, B2; B4, B3; and B5, B4.

The voltage measurement device 130 can be implemented using a microprocessor or microcontroller, with an analog-to-digital converter either on the chip or separate. The processor or controller can execute software and control various operations using I/O (input/output) ports. Depending upon how many cells are stacked in the battery stack, the voltage measurement device 130 could include a high-voltage port or more than one processor or analog-to-digital converter, to span the voltage range of the battery stack. In one version, the voltage measurement device 130 can measure voltages to about 1 mV accuracy.

Should measurements of cell voltages determine that a cell is in need of being discharged, each cell has a corresponding discharge resistor 104, 108, 112, 116, and 120. Each discharge resistor is accompanied by a respective switch S1, S2, S3, S4, S5. For example, Cell 1 can be discharged through the resistor 104 and the switch S1. Cell 2 can be discharged through the resistor 108 and the switch S2, and so on. The switches S1, S2, S3, S4, S5 are implemented using a transistor, specifically an N type MOSFET (metal oxide semiconductor field effect transistor), but could be implemented using other types of MOSFETs, bipolar or other types of transistors, or a relay, a mechanical switch or other type of switch. Control voltages, illustrated as Enable 1-5 signals, for the N type MOSFET switches should have appropriate levels to turn the switches on and off. Control signals for other types of switches are readily devised.

It should be appreciated that the discharge resistor is larger in magnitude than internal battery cell resistance, and the low pass filtered cell voltage as observed at the terminals B5, B4, B3, B2, B1, B0 may not drop appreciably when a cell is being discharged. It is therefore difficult to detect whether discharge is operating properly. For example, if a discharge resistor has become disconnected or burned out, or if the switch has become damaged, it may be difficult to detect proper operation of the discharge through voltage measurements at the terminals B5, B4, B3, B2, B1, B0.

Figure 2:
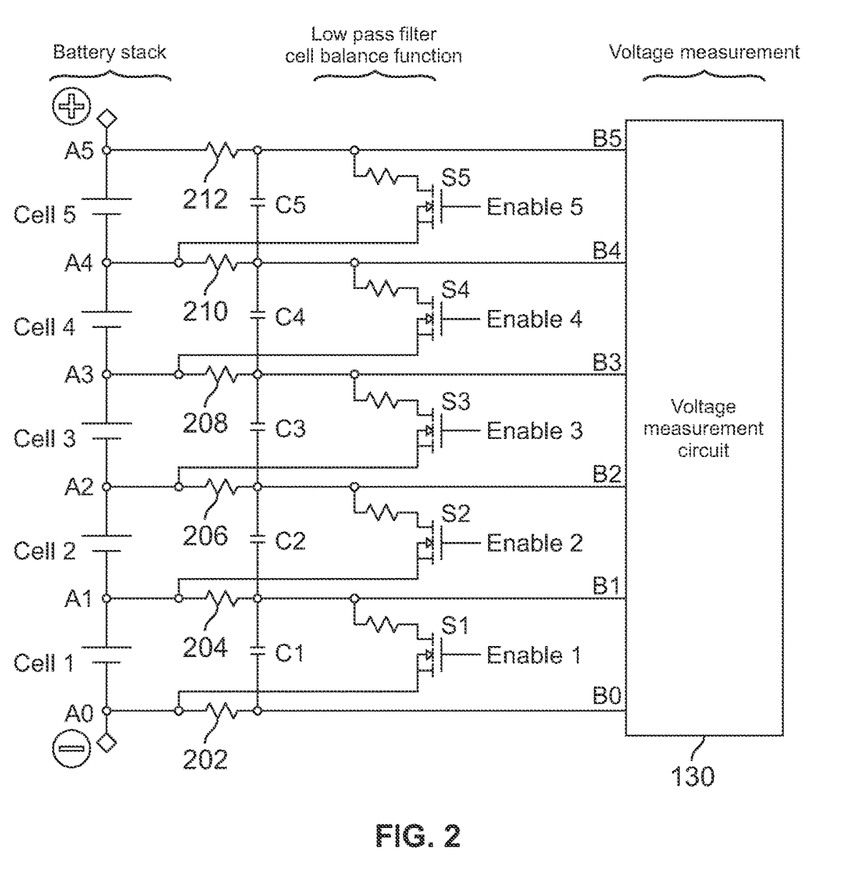
FIG. 2 is a schematic of a further battery cell balancing and measuring apparatus, in accordance with the present invention.

FIG. 2 shows a battery cell balancing and measuring apparatus in accordance with some embodiments. Embodiments of the apparatus of FIG. 2 have fewer components than the apparatus of FIG. 1, and make dual use of the resistors. As illustrated and explained below, each discharge resistor in the circuits shown in FIGS. 2-4 also serves as part of a low pass filter. In addition, each of the low pass filters and the resistor (or one of the resistors if there is more than one) from the filter also serves as a discharge resistor for a battery cell. For example, the voltage across Cell 1 of the battery stack is filtered through a low pass filter made up of two resistors 204, 202 and a capacitor C1. The low pass filtered voltage of Cell 1 is expressed across the pair of terminals B1, B0, and can be measured by the voltage measurement device 130 coupled to the terminals. Similarly, the voltage across Cell 2 of the battery stack is filtered through a low pass filter made up of two resistors 206, 204 and a capacitor C2 and presented across the pair of terminals B2, B1 for measurement by the voltage measurement device 130.

Cell 1 can be discharged via resistor 204 that is also employed in the low pass filter for cell 1. As illustrated, Cell 1 is discharged via the resistor 204 and a switch S1. Similarly, Cell 2 can be discharged via the same resistor 206 as employed in the low pass filter for that cell. From this example, it should be appreciated that the discharge resistor 204 for Cell 1 also functions in the low pass filter made up of resistor 204 in series with a capacitor C1 and another resistor 202. The discharge resistor 206 for Cell 2 also functions in the low pass filter made up of that resistor 206 in series with a capacitor C2 and the resistor 204 that is used as a discharge resistor for Cell 1. The battery cell balancing and measuring apparatus of FIG. 2 thus reuses the resistors in multiple roles, as described in the circuit trace below.

First terminals A0, A1, A2, A3, A4, and A5 act as battery cell connection terminals and couple to the cells in the battery stack, with terminal A0 coupling to the negative terminal of the battery stack, which is also the negative terminal of Cell 1. Terminal A1 couples to the common node of the first and second cells, and this common node is coupled to the positive terminal of Cell 1 and the negative terminal of Cell 2. Terminal A2 couples to the common node of the second and third cells, which is coupled to the positive terminal of Cell 2 and the negative terminal of Cell 3. Terminal A3 couples to the common node of the third and fourth cells, which is also the positive terminal of the Cell 3 and the negative terminal of Cell 4. Terminal A4 couples to the common node of the fourth and fifth cells, which is coupled to the positive terminal of Cell 4 and the negative terminal of Cell 5. Terminal A5 couples to the positive terminal of the battery stack which couples to the positive terminal of Cell 5. Each of the first terminals A0, A1, A2, A3, A4, and A5 corresponds to one of the second terminals B0, B1, B2, B3, B4, and B5, respectively, which act as voltage measurement terminals. That is, battery cell connection terminal A0 corresponds to voltage measurement terminal B0, and so on up to first terminal A5, which corresponds to second terminal B5. Battery cell voltages from the first terminals are presented or expressed at the corresponding second terminals for measurement by the voltage measurement circuit 130. It should be appreciated that A0 and A1, as well as other adjacent first terminals, may be refer to as a terminal pair. Similarly B0 and B1, as well a other adjacent second terminals, may also be referred to as terminal pairs.

Each of the first terminals is coupled to a corresponding resistor, which is then coupled to the corresponding one of the second terminals. A first resistor 202 couples to a first one of the first terminals A0 and couples to a first one of the second terminals B0. A second resistor 204 couples to a second one of the first terminals A1 and couples to a second one of the second terminals B1. A third resistor 206 couples to a third one of the first terminals A2 and couples to a third one of the second terminals B2. A fourth resistor 208 couples to a fourth one of the first terminals A3 and couples to a fourth one of the second terminals B3. A fifth resistor 210 couples to a fifth one of the first terminals A4 and couples to a fifth one of the second terminals B4. A sixth resistor 212 couples to a sixth one of the first terminals A5 and couples to a sixth one of the second terminals B5. Each of these second through sixth resistors 204, 206, 208, 210, 212 acts as both a load resistor, for cell discharge, and a resistor in an RC low pass filter, for voltage filtering. In one version, resistors in a range of about 22 ohms or 33 ohms are used to produce a cell discharge current in a range of about 100 mA.

A first capacitor C1 couples across a first pair of second terminals B1, B0. A second capacitor C2 couples across a second pair of second terminals B2, B1. A third capacitor C3 couples across a third pair of second terminals B3, B2. A fourth capacitor C4 couples across a fourth pair of second terminals B4, B3. A fifth capacitor C5 couples across a fifth pair of second terminals B5, B4. Each cell of the battery stack thus has a corresponding capacitor, for use in a corresponding RC low pass filter. Because the balance or load resistor from the cell discharge circuit is reused as a resistor in the resistor capacitor (RC) low pass filter, the capacitor in the RC low pass filter will be of a greater capacitance than would be the case with a larger resistance in an RC filter that is separate from the balance or load resistor, as shown in FIG. 1. It should be appreciated that capacitor C1 also couples terminal pair A0 and A1 through resistor 204. In addition, the remainder of the terminal pairs that include adjacent terminals of terminals A1-A5 are coupled through a respective capacitor via a respective resistor.

Continuing with FIG. 2, a first switch S1, in this embodiment implemented as an N type MOSFET, couples to a first one of the first terminals A0 and couples to a second one of the second terminals B1. A second switch S2 couples to a second one of the first terminals A1 and couples to a third one of the second terminals B2. A third switch S3 couples to a third one of the first terminals A2 and couples to a fourth one of the second terminals B3. A fourth switch S4 couples to a fourth one of the first terminals A3 and couples to a fifth one of the second terminals B4. A fifth switch S5 couples to a fifth one of the first terminals A4 and couples to a sixth one of the second terminals B5. Each cell of the battery stack thus has a corresponding switch, for use in discharging the cell.

Cell voltage of Cell 1 is low pass filtered through an RC filter made of resistor 204, capacitor C1 and resistor 202 in series, with the low pass voltage of Cell 1 presented at the common junction of resistor 204 and capacitor C1. It should be appreciated that this common junction is also electrically connected to terminal B1. The first cell can be discharged by passing cell current from the positive terminal of Cell 1, as available at terminal A1, through resistor 204 and switch S1, returning the cell current to the negative terminal of Cell 1, as available at terminal A0. The first switch S1 is open or deactivated when the voltage of the first cell is being low pass filtered, and the first switch S1 is closed or activated, i.e. the N type MOSFET is turned on, when the first cell is being discharged. Similarly, cell voltage of Cell 2 is low pass filtered through resistor 206, capacitor C2 and resistor 204. Cell 2 can be discharged by activating switch S2 and passing cell current through resistor 206 and switch S2. The remaining cells, Cell 3, Cell 4, and Cell 5 are similarly low pass filtered and discharged using corresponding resistor pairs 208, 206; 210, 208; and 212, 210, capacitors C3, C4, and C5 and switches S3, S4, and S5, respectively.

Figure 3:
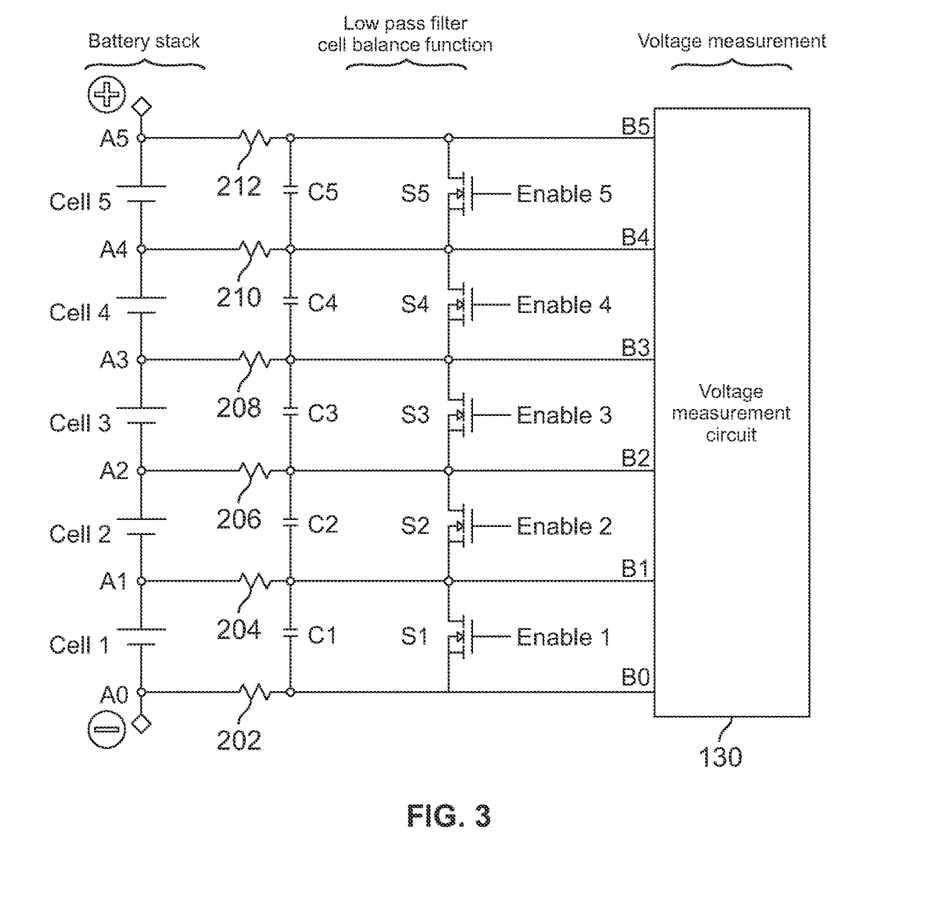
FIG. 3 is a schematic of an embodiment of the battery cell balancing and measuring apparatus of FIG. 2.

FIG. 3 shows a further embodiment of the battery cell balancing and measuring apparatus. As with the embodiment shown in FIG. 2, the embodiment of FIG. 3 has fewer components than the apparatus of FIG. 1, and makes dual use of the resistors. The low pass filters operate similarly to those of the embodiment in FIG. 2. In the embodiment of FIG. 3, each cell discharge current is routed through two resistors and a corresponding switch. For example, the voltage across Cell 1 of the battery stack is filtered through the low pass filter made up of resistors 204 and 202 and the capacitor C1. Cell 1 can be discharged through the same two resistors (204 and 202) as employed in the low pass filter for that cell. Similarly, Cell 2 is filtered through the low pass filter made up of resistors 206 and 204 and the corresponding capacitor C2. Cell 2 is discharged via these same two resistors 206, 204 and the switch S2.

Continuing with FIG. 3, first terminals A0, A1, A2, A3, A4, and A5 are battery cell connection terminals, and second terminals B0, B1, B2, B3, B4, and B5 are voltage measurement terminals as described with reference to FIG. 2. Capacitors C1, C2, C3, C4, and C5 are coupled across pairs of second terminals as described in FIG. 2. Resistors 202, 204, 206, 208, 210, 212 are coupled to corresponding first and second terminals as described in FIG. 2. It should be appreciated that each of resistors 202, 204, 206, 208, 210, and 212 acts as both a load resistor, for cell discharge, and a resistor in an RC low pass filter, for voltage filtering. Connections of the switches differ between the embodiments illustrated in FIGS. 2 and 3. In the embodiment of FIG. 3, each switch is coupled across a corresponding pair of the second terminals of the apparatus in a stacked configuration. Switch S1 couples across a first pair of second terminals B1 and B0. Switch S2 couples across a second pair of second terminals B2 and B1. Switch S3 couples across a third pair of second terminals B3 and B2. Switch S4 couples across a fourth pair of second terminals B4 and B3. Switch S5 couples across a fifth pair of second terminals B5 and B4. It should be appreciated that the capacitors and the switches of FIG. 3 may be referred to as being configured in a stacked configuration with the inlets and outlets of the respective capacitors and the inlets and outlets of the respective switches directly coupled to each other along the terminal pairs.

Figure 4:
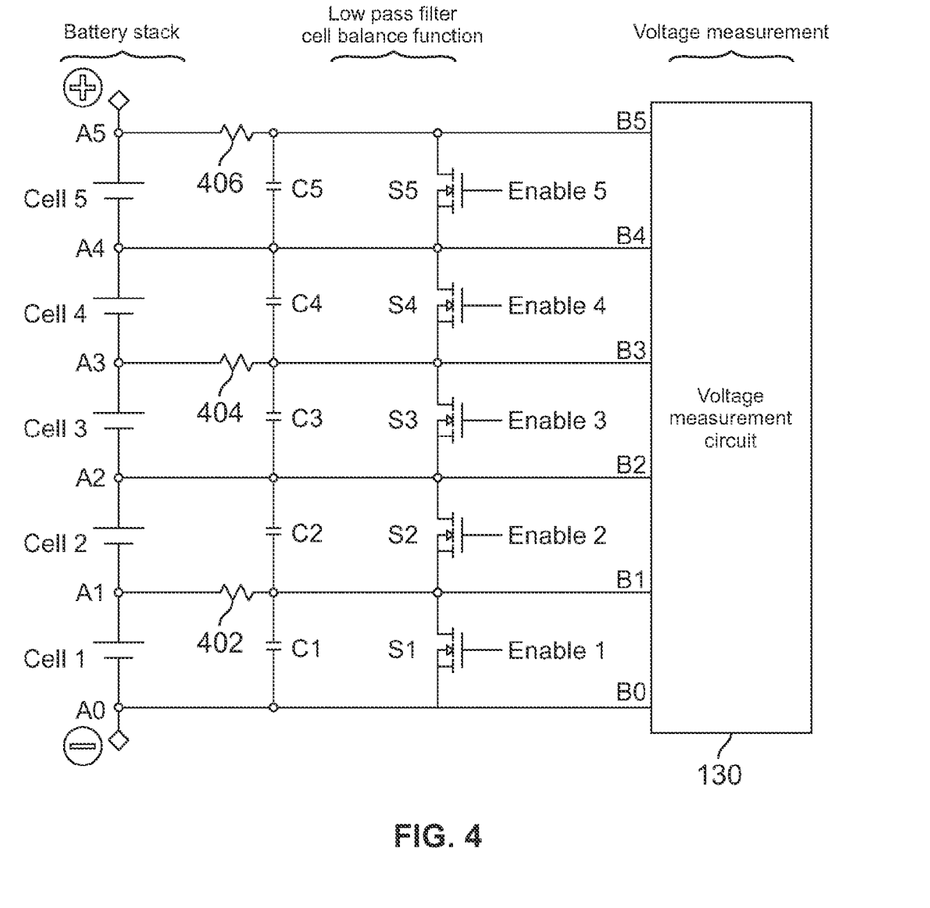
FIG. 4 is a schematic of a variation of the battery cell balancing and measuring apparatus of FIG. 3.

FIG. 4 shows a still further embodiment of the battery cell balancing and measuring apparatus. It should be appreciated that the embodiment of FIG. 4 has fewer components than the apparatuses of FIGS. 1, 2 and 3, and makes dual use of the resistors. In the embodiment of FIG. 4, each cell discharge current is routed through one resistor and a switch. The same resistor is reused in an RC filter for the cell. Moreover, the same resistor is reused in an RC filter for a neighboring cell, and is reused in the discharge path of that neighboring cell. With this reuse, the embodiment of FIG. 4 has half as many resistors as the embodiment of FIG. 3. For example, the voltage across Cell 1 of the battery stack is filtered through the low pass filter made up of the resistor 402 and the capacitor C1. Cell 1 can be discharged through the same resistor 402 as employed in the low pass filter for that cell. Cell 1 is discharged via the resistor 402 and the switch S1, with the switch activated or closed. Similarly, Cell 2 is filtered through the low pass filter made up of the same resistor 402 and the capacitor C2. Cell 2 is discharged via the resistor 402 and the switch S2. First terminals A0, A1, A2, A3, A4, and A5 act as battery cell connection terminals, and second terminals B0, B1, B2, B3, B4, and B5 act as voltage measurement terminals as described in FIG. 2, which is not repeated here for the sake of brevity. Capacitors C1, C2, C3, C4, and C5 are coupled across pairs of second terminals as described in FIG. 2. Switches S1, S2, S3, S4, and S5 are coupled across pairs of second terminals as described in FIG. 3.

Connections of the resistors differ between FIGS. 3 and 4. In the embodiment of FIG. 4, corresponding first and second terminals with a resistor coupled between the terminals alternate with corresponding first and second terminals that do not have a resistor coupled to the terminals. Terminal A0 is coupled directly across to one of the second terminals B0, without an intervening resistor. Terminal A1 is coupled to one end of the first resistor 402, and the other end of the resistor 402 is coupled to one of the second terminals B1. Terminal A2 is coupled directly across to one of the second terminals B2, without an intervening resistor. Terminal A3 is coupled to one end of resistor 404, and the other end of the resistor 404 is coupled to one of the second terminals B3. Terminal A4 is coupled directly across to the fifth one of the second terminals B4, without an intervening resistor. Terminal A5 is coupled to one end of resistor 406, and the other end of the resistor 406 is coupled to the sixth one of the second terminals B5. Thus, the configuration of FIG. 4 provides for successive terminals with every other one of the successive terminals having a resistor in line. It should be appreciated that each of resistors 402, 404, 406 acts as both a load resistor, for cell discharge, and a resistor in an RC low pass filter, for voltage filtering.

In the battery cell balancing and measuring apparatus of FIG. 4 switches S3, S4 might erroneously be activated and discharge Cell 3, Cell 4 without benefit of a corresponding load resistor. This type activation might damage or destroy one or both of the switches. By contrast, the battery cell balancing and measuring apparatus of FIG. 3 would discharge Cell 3 and Cell 4 through the third and fifth resistors 206, 210 in this situation, which would not damage the switches. The battery cell balancing and measuring apparatus of FIG. 2 would discharge Cell 3 and Cell 4 through the fourth and fifth resistors 208, 210, respectively, in this situation and would not damage the switches. Thus, the apparatus of FIG. 4 may be suitable for discharging a single cell at a time, and the apparatuses of FIGS. 2 and 3 may be suitable for discharging more than one cell at a time. It should be appreciated that further embodiments could be devised by combining features from FIGS. 2, 3 and 4.

Embodiments of the battery cell balancing and measuring apparatus of FIGS. 2-4 require fewer resistors. In addition, the embodiments of FIGS. 2-4 can more readily detect failure of a load resistor or a switch, as compared to the apparatus in FIG. 1. In FIG. 1, activating a switch to discharge a cell, for example switch S4 to discharge Cell 4, will result in a slightly lower cell voltage appearing across the second terminals B4 and B3, to be measured by the voltage measurement device 130. In an electrically noisy environment such as an electric or hybrid vehicle, this voltage change may be difficult to detect. In FIGS. 2-4, activating the switch S4 to discharge Cell 4 will result in a much lower voltage, which could be approximately 0 V, appearing across the second terminals B4 and B3. This lower voltage would more readily be measured in an electrically noisy environment, which would allow verification that the load resistor and the switch are functioning correctly. The voltage appearing across the second terminals B4 and B3 depends upon the ratio of the "on" resistance of the switch and the resistance of the load resistor to which the switch is coupled. Conversely, if upon activating the switch S4 the voltage observed at the second terminals B4 and B3 appears relatively unchanged, the system could then deduce that there is likely a failure of the load resistor and/or the switch. Thus, the embodiments of FIGS. 2-4 support fault detection and other diagnostics, which could be implemented using software, firmware and/or hardware.

Some versions of the battery cell balancing and measuring apparatus suspend balancing while measuring the voltage of the cells. It should be appreciated that the measured voltages should not be outside of the measurement range of any voltage measurement device coupled to the terminals, so as not to damage the voltage measurement device. Software, hardware or firmware that implements a balancing and measuring algorithm may alternate between two or more settings, discharge or charge any one cell, discharge or charge a combination of cells, or combine charging or discharging of one or more cells while measuring voltage of one or more other cells and so on.

Figure 5:
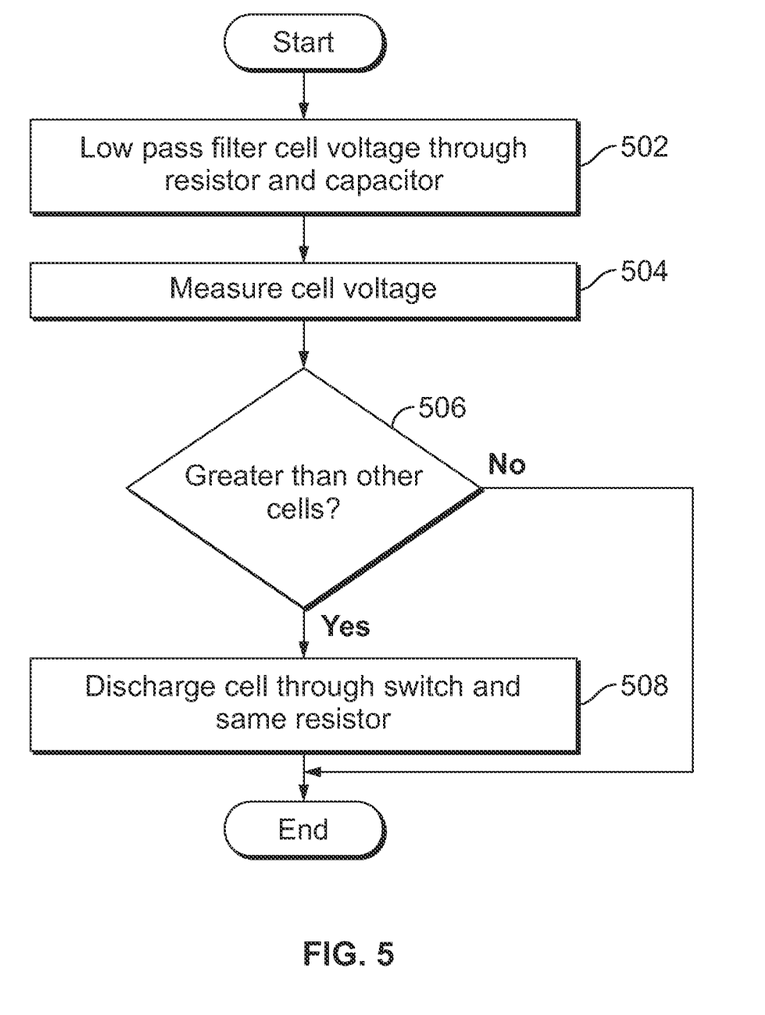
FIG. 5 is a flow diagram of a method of measuring cell voltage and balancing cells.

FIG. 5 is a flow diagram, showing a method of measuring cell voltage and balancing cells in a battery stack. The method can be practiced using embodiments of the battery cell balancing and measuring apparatus of FIGS. 2-4. Proceeding from a start point, a cell voltage is low pass filtered through a resistor and a capacitor, in an action 502. For example, in FIG. 2, Cell 2 can be low pass filtered through a circuit that includes a resistor and a capacitor, with a switch opened or deactivated. In an action 504, the cell voltage is measured. For example, in FIG. 2 the cell voltage of Cell 2 can be measured, as filtered by the low pass filter at the second terminal. The measurement can be made by the voltage measurement device. After measuring the cell voltage, it is determined in an action 506, if the cell voltage is greater than the voltage of other cells. If the answer is no, the measured cell voltage is not greater than the cell voltage of other cells, the flow bypasses the action 508 and terminates. If the answer is yes, the measured cell voltage is greater than the cell voltage to other cells, the flow proceeds to the action 508. In the action 508, the cell is discharged through a switch and the same resistor. This action captures the reuse of a resistor from an RC low pass filter as the balance resistor, and vice versa. Continuing with the example of Cell 2 in FIG. 2, this cell is discharged through the switch and the resistor, with the switch closed or activated.

This method can be practiced with other cells in FIG. 2, and with any of the cells in FIGS. 3 and 4. For purposes of balancing all of the cells in a battery stack, the method would be applied to each cell in the stack, with cell discharge called for when a cell voltage is too large as compared with other cells. In variations of the method, the voltage of each cell can be determined prior to any decisions as to discharging. The actions of low pass filtering and cell discharging could be swapped. The frequency of measuring and the frequency of cell discharge can be adjusted for various applications. For example, for a battery float charging system, the cells might need to be checked and balanced relatively infrequently. In a hybrid automobile, the cells might be checked many times during even a brief charging cycle.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A battery cell balancing and measuring apparatus, comprising:
   a plurality of terminals having a portion of the terminals grouped as terminal pairs, each terminal pair coupled across one of a plurality of battery cells, each terminal pair having a resistive element;
   a capacitor coupled between a first terminal and a second terminal of a first terminal pair of the plurality of terminals to form a low-pass filter with a first resistive element of the first terminal pair, wherein the first terminal pair is coupled across a first battery cell of the plurality of battery cells; and
   a plurality of resistors, each resistor directly coupled at one end to a respective one of the first terminals and coupled at an opposing end to a corresponding one of the second terminals of the plurality of terminals; and
   a plurality of switches comprising a discharge circuit for each terminal pair, wherein a number of switches is equals in number to a number of battery cells, each switch coupled to one of second terminals and coupled to one of first terminals, wherein a first switch of the plurality of switches when activated provides a discharge path for the first cell through a first resistor of the plurality of resistors and through the first switch, and when the first switch is deactivated a voltage of the first cell is expressed at a corresponding pair of the second terminals, the voltage of the first cell filtered through a low pass filter that includes the first resistor and the first capacitor of the plurality of capacitors.

2. The battery cell balancing and measuring apparatus of claim 1, wherein for each terminal pair, the respective battery cell is discharged through a respective resistive element coupled to a respective switch.

3. The battery cell balancing and measuring apparatus of claim 1, wherein each resistive element associated with each terminal pair is operable as a load resistor during cell discharge and a component of a low pass filter for a voltage measuring device measuring a voltage across terminal pairs.

4. The battery cell balancing and measuring apparatus of claim 1, wherein:
   the switch has a first switch terminal coupled to one of the plurality of terminals; and
   the switch has a second switch terminal coupled to a next one of the plurality of terminals in succession.

5. The battery cell balancing and measuring apparatus of claim 1, further comprising:
   a voltage measurement device coupled across the low pass filter formed by the capacitor and the first resistive element.

6. The battery cell balancing and measuring apparatus of claim 1, wherein the resistive element associated with each terminal pair is coupled to a higher voltage terminal of each of the terminal pairs.

7. The battery cell balancing and measuring apparatus of claim 1, wherein one terminal of each of the terminal pairs has a respective resistive element coupled thereto.

8. The battery cell balancing and measuring apparatus of claim 1, wherein the switch of the discharge circuit includes one of: a transistor, a MOSFET (metal oxide semiconductor field effect transistor), or a relay.

9. The battery cell balancing and measuring apparatus of claim 1, wherein the discharge path includes the first resistive element in series with the switch and the low pass filter path includes the first resistive element in series with the capacitor.

10. A battery cell balancing and measuring apparatus, comprising:
    a plurality of first terminals configured to connect to nodes of a battery stack;
    a plurality of second terminals equal in number to a number of the plurality of first terminals;
    a plurality of capacitors equal in number to a number of cells in the battery stack, the plurality of capacitors being coupled in series, with each capacitor coupled across a corresponding pair of the second terminals;
    a plurality of resistors, each resistor directly coupled at one end to a respective one of the first terminals and coupled at an opposing end to a corresponding one of the second terminals; and
    a plurality of switches equal in number to the number of cells, each switch coupled to one of the second terminals and coupled to one of the first terminals, wherein a first switch of the plurality of switches when activated provides a discharge path for a first cell of the battery stack through a first resistor of the plurality of resistors and through the first switch, and when the first switch is deactivated a voltage of the first cell is expressed at the corresponding pair of the second terminals, the voltage of the cell filtered through a low pass filter that includes the first resistor and a first capacitor of the plurality of capacitors.

11. The battery cell balancing and measuring apparatus of claim 10, wherein:
    the battery stack includes the first cell, a second cell and a third cell coupled in series;
    the plurality of first terminals includes a first one of the first terminals configured to connect to a negative terminal of the first cell, a second one of the first terminals configured to connect to a common node of the first cell and the second cell, a third one of the first terminals configured to connect to a common node of the second cell and the third cell, and a fourth one of the first terminals configured to connect to a positive terminal of the third cell;
    the plurality of capacitors includes the first capacitor coupled to a first one of the second terminals and to a second one of the second terminals, a second capacitor coupled to the second one of the second terminals and to a third one of the second terminals, and a third capacitor coupled to the third one of the second terminals and to a fourth one of the second terminals;
    the plurality of resistors includes the first resistor coupled to the first one of the first terminals and to the first one of the second terminals, a second resistor coupled to the second one of the first terminals and to the second one of the second terminals, a third resistor coupled to the third one of the first terminals and to the third one of the second terminals, and a fourth resistor coupled to the fourth one of the first terminals and to the fourth one of the second terminals; and
    the plurality of switches includes the first switch coupled to a first terminal of the first resistor at the first one of the first terminals and to a second terminal of the second resistor at the second one of the second terminals, a second switch coupled to a first terminal of the second resistor at the second one of the first terminals and to a second terminal of the third resistor at the third one of the second terminals, and a third switch coupled to a first terminal of the third resistor at the third one of the first terminals and to a second terminal of the fourth resistor at the fourth one of the second terminals.

12. The battery cell balancing and measuring apparatus of claim 10, wherein:
    the battery stack includes the first cell, a second cell and a third cell coupled in series;
    the plurality of first terminals includes a first one of the first terminals configured to connect to a negative terminal of the first cell, a second one of the first terminals configured to connect to a common node of the first cell and the second cell, a third one of the first terminals configured to connect to a common node of the second cell and the third cell, and a fourth one of the first terminals configured to connect to a positive terminal of the third cell;
    the plurality of capacitors includes the first capacitor coupled to a first one of the second terminals and to a second one of the second terminals, a second capacitor coupled to the second one of the second terminals and to a third one of the second terminals, and a third capacitor coupled to the third one of the second terminals and to a fourth one of the second terminals;
    the plurality of resistors includes the first resistor coupled to the first one of the first terminals and to the first one of the second terminals, a second resistor coupled to the second one of the first terminals and to the second one of the second terminals, a third resistor coupled to the third one of the first terminals and to the third one of the second terminals, and a fourth resistor coupled to the fourth one of the first terminals and to the fourth one of the second terminals; and
    the plurality of switches includes the first switch coupled to a terminal of the first resistor at the first one of the second terminals and to a terminal of the second resistor at the second one of the second terminals, a second switch coupled to the terminal of the second resistor at the second one of the second terminals and to a terminal of the third resistor at the third one of the second terminals, and a third switch coupled to the terminal of the third resistor at the third one of the second terminals and to a terminal of the fourth resistor at the fourth one of the second terminals.

13. The battery cell balancing and measuring apparatus of claim 10, wherein:
    the battery stack includes the first cell, a second cell and a third cell coupled in series;
    the plurality of first terminals includes the first one of the first terminals configured to connect to a negative terminal of the first cell, a second one of the first terminals configured to connect to a common node of the first cell and the second cell, a third one of the first terminals configured to connect to a common node of the second cell and the third cell, and a fourth one of the first terminals configured to connect to a positive terminal of the third cell;
    the plurality of capacitors includes the first capacitor coupled to a first one of the second terminals and to a second one of the second terminals, a second capacitor coupled to the second one of the second terminals and to a third one of the second terminals, and a third capacitor coupled to the third one of the second terminals and to a fourth one of the second terminals;
    the plurality of resistors includes the first resistor coupled to the second one of the first terminals and to the second one of the second terminals, and a second resistor coupled to the fourth one of the first terminals and to the fourth one of the second terminals; and the plurality of switches includes the first switch coupled with no intervening resistor to the first one of the second terminals and with no intervening resistor to the second one of the second terminals, a second switch coupled with no intervening resistor to the second one of the second terminals and with no intervening resistor to the third one of the second terminals, and a third switch coupled with no intervening resistor to the third one of the second terminals and with no intervening resistor to the fourth one of the second terminals.

14. The battery cell balancing and measuring apparatus of claim 10, wherein each switch of the plurality of switches includes a MOSFET (metal oxide semiconductor field effect transistor).

15. The battery cell balancing and measuring apparatus of claim 10, further comprising:

a voltage measurement device coupled to the plurality of second terminals, the voltage measurement device configured to detect a circuit fault in response to the voltage of the first cell, filtered through the low pass filter, being approximately unchanged with the first switch being deactivated and the first switch being activated.

16. A method of measuring cell voltage and balancing cells in a battery stack, comprising:

deactivating a switch to low pass filter a voltage of one of a plurality of cells in a battery pack via a resistor and a capacitor in series with each other; and activing the switch to pass a discharge current of the one of the plurality of cells through the resistor and the switch;

a plurality of resistors, each resistor directly coupled at one end to a respective one of the first terminals and coupled at an opposing end to a corresponding one of the second terminals of the plurality of terminals; and a plurality of switches comprising a discharging circuit for each terminal pair, each terminal pair coupled across one of the plurality of battery cells, wherein a number of switches is equal in number to a number of battery cells, each switch coupled to one of second terminals and coupled to one of first terminals, wherein a first switch of the plurality of switches when activated provides a discharge path for the first cell through a first resistor of the plurality of resistors and through the first switch, and when the first switch is deactivated a voltage of the first cell is expressed at a corresponding pair of the second terminals, the voltage of the first cell filtered through a low pass filter that includes the first resistor and the capacitor of the plurality of capacitors.

17. The method of claim 16, further comprising:

low pass filtering a second voltage of a second one of the plurality of cells via a second resistor and a second capacitor in series with each other, with a second switch deactivated; wherein:

passing the discharge current of the one of the plurality of cells through the resistor and the switch is in response to the low pass filtered voltage being greater than the low pass filtered second voltage.

18. The method of claim 16, wherein the discharge current of the one of the plurality of cells is passed through the resistor and the switch until the one of the plurality of cells and a second one of the plurality of cells are balanced.

19. The method of claim 16, further comprising:

measuring a first voltage across the capacitor, with the switch deactivated;

measuring a second voltage across the capacitor, with the switch activated; and determining a correct circuit operation as a result of the second voltage differing from the first voltage.

20. The method of claim 16, further comprising:

presenting a low pass filtered voltage of the one of the plurality of cells at a common terminal of the resistor and the capacitor, with the switch deactivated.

\* \* \* \* \*